United States Patent
Granbery

(10) Patent No.: US 11,218,859 B2
(45) Date of Patent: Jan. 4, 2022

(54) SYSTEMS AND METHODS FOR ENABLING ADDITIONAL DEVICES TO CHECK IN TO BLUETOOTH LOW ENERGY (BLE) BEACONS

(71) Applicant: PAYPAL, INC., San Jose, CA (US)

(72) Inventor: John Hastings Granbery, Los Altos, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/854,824

(22) Filed: Apr. 21, 2020

(65) Prior Publication Data

US 2020/0252777 A1    Aug. 6, 2020

Related U.S. Application Data

(63) Continuation of application No. 16/372,729, filed on Apr. 2, 2019, now Pat. No. 10,631,154, which is a (Continued)

(51) Int. Cl.
*H04B 7/00* (2006.01)
*H04W 4/80* (2018.01)
(Continued)

(52) U.S. Cl.
CPC .............. *H04W 4/80* (2018.02); *G06F 21/10* (2013.01); *G06F 21/31* (2013.01); *G06F 21/35* (2013.01);
(Continued)

(58) Field of Classification Search
CPC ......... H04W 4/80; H04W 76/34; H04W 4/21; H04W 76/11; H04W 4/06; H04W 8/005;
(Continued)

(56) References Cited

U.S. PATENT DOCUMENTS 7,610,616 B2 * 10/2009 Masuouka .......... H04L 63/0823
                                                          726/5
7,693,512 B1 *  4/2010 West .................... H04W 4/029
                                                         455/417

(Continued)

FOREIGN PATENT DOCUMENTS

CN            1750713 A      3/2006
CN          101783693 A      7/2010
(Continued)

OTHER PUBLICATIONS

European Appl. No. EP14842008, Extended European Search Report dated Jul. 3, 2017, 13 pages.
(Continued)

*Primary Examiner* — April G Gonzales
(74) *Attorney, Agent, or Firm* — Haynes and Boone, LLP

(57) ABSTRACT

Systems and methods are provided for checking many users in to a location using a Bluetooth® low energy (BLE) beacon. The provided systems and methods may allow a BLE beacon to facilitate a check in with a remote server that processes check ins and then disconnect from the device used to check in. The device may be assigned a unique identifier that may be broadcast from the device during the check in so that the BLE beacon can quickly scan for the identifier and connect with the device based on the identifier to provide content and other information to the device.

21 Claims, 8 Drawing Sheets

Related U.S. Application Data continuation of application No. 15/431,639, filed on Feb. 13, 2017, now Pat. No. 10,251,041, which is a continuation of application No. 15/230,239, filed on Aug. 5, 2016, now Pat. No. 9,571,957, which is a continuation of application No. 14/248,263, filed on Apr. 8, 2014, now Pat. No. 9,445,220.

(60) Provisional application No. 61/874,587, filed on Sep. 6, 2013.

(51) Int. Cl.

| | | |
|---|---|---|
| *H04W 4/21* | (2018.01) | |
| *H04W 76/11* | (2018.01) | |
| *G06Q 20/20* | (2012.01) | |
| *G06F 21/10* | (2013.01) | |
| *G06F 21/35* | (2013.01) | |
| *H04W 12/06* | (2021.01) | |
| *G06Q 30/00* | (2012.01) | |
| *H04W 12/50* | (2021.01) | |
| *H04W 12/0431* | (2021.01) | |
| *G06F 21/31* | (2013.01) | |
| *G06Q 20/32* | (2012.01) | |
| *H04B 7/26* | (2006.01) | |
| *H04L 29/08* | (2006.01) | |
| *H04W 40/24* | (2009.01) | |
| *H04W 4/02* | (2018.01) | |
| *H04W 4/06* | (2009.01) | |
| *H04W 12/04* | (2021.01) | |
| *H04W 76/34* | (2018.01) | |
| *G06Q 20/12* | (2012.01) | |
| *G06Q 30/02* | (2012.01) | |
| *H04L 29/06* | (2006.01) | |
| *H04W 8/00* | (2009.01) | |
| *H04W 48/10* | (2009.01) | |
| *H04W 12/02* | (2009.01) | |
| *H04W 12/71* | (2021.01) | |
| *H04W 12/75* | (2021.01) | |
| *H04L 9/06* | (2006.01) | |

(52) U.S. Cl.
CPC ............ *G06Q 20/12* (2013.01); *G06Q 20/20* (2013.01); *G06Q 20/327* (2013.01); *G06Q 20/3223* (2013.01); *G06Q 20/3224* (2013.01); *G06Q 30/00* (2013.01); *G06Q 30/0267* (2013.01); *H04B 7/26* (2013.01); *H04L 63/0876* (2013.01); *H04L 67/18* (2013.01); *H04L 67/22* (2013.01); *H04L 67/24* (2013.01); *H04W 4/025* (2013.01); *H04W 4/06* (2013.01); *H04W 4/21* (2018.02); *H04W 8/005* (2013.01); *H04W 12/04* (2013.01); *H04W 12/0431* (2021.01); *H04W 12/06* (2013.01); *H04W 12/50* (2021.01); *H04W 40/244* (2013.01); *H04W 48/10* (2013.01); *H04W 76/11* (2018.02); *H04W 76/34* (2018.02); *H04L 9/0631* (2013.01); *H04L 63/068* (2013.01); *H04L 63/0823* (2013.01); *H04W 12/02* (2013.01); *H04W 12/71* (2021.01); *H04W 12/75* (2021.01)

(58) Field of Classification Search
CPC ... H04W 12/04; H04W 12/06; H04W 40/244; H04W 48/10; H04B 7/26
USPC ........................................................ 455/41.2
See application file for complete search history.

(56) References Cited

U.S. PATENT DOCUMENTS

| | | | | |
|---|---|---|---|---|
| 7,831,061 | B1* | 11/2010 | Lubard | A61B 5/164 |
| | | | | 382/100 |
| 8,166,159 | B2* | 4/2012 | Kalasapur | G06Q 10/00 |
| | | | | 709/224 |
| 8,774,778 | B2* | 7/2014 | Faillaci | G06Q 50/01 |
| | | | | 455/414.2 |
| D717,309 | S | 11/2014 | Govindarajan | |
| 8,972,296 | B2* | 3/2015 | Govindarajan | G06Q 20/3224 |
| | | | | 705/39 |
| 9,037,082 | B2* | 5/2015 | Chatterton | H04W 4/80 |
| | | | | 455/41.1 |
| 9,531,772 | B2* | 12/2016 | DeLuca | H04L 63/068 |
| 9,576,289 | B2* | 2/2017 | Henderson | G06Q 20/4014 |
| 9,886,727 | B2* | 2/2018 | Curtis | G06Q 50/01 |
| 2003/0004743 | A1* | 1/2003 | Callegari | G06Q 30/02 |
| | | | | 705/1.1 |
| 2003/0191818 | A1* | 10/2003 | Rankin | H04L 69/329 |
| | | | | 709/219 |
| 2007/0013509 | A1* | 1/2007 | Lakshmanan | B60N 2/002 |
| | | | | 340/538 |
| 2008/0065892 | A1* | 3/2008 | Bailey | H04L 9/0897 |
| | | | | 713/171 |
| 2008/0280624 | A1* | 11/2008 | Wrappe | G01S 5/0036 |
| | | | | 455/456.1 |
| 2009/0216093 | A1* | 8/2009 | Sebastian | A61B 5/1113 |
| | | | | 600/301 |
| 2009/0299197 | A1* | 12/2009 | Antonelli | A61B 5/0816 |
| | | | | 600/485 |
| 2009/0327135 | A1* | 12/2009 | Nguyen | G06Q 20/40 |
| | | | | 705/44 |
| 2010/0063867 | A1* | 3/2010 | Proctor, Jr. | G06Q 30/0242 |
| | | | | 455/414.1 |
| 2010/0082481 | A1* | 4/2010 | Lin | G06Q 40/00 |
| | | | | 705/41 |
| 2011/0010291 | A1* | 1/2011 | Adams | G06Q 20/346 |
| | | | | 705/39 |
| 2011/0021142 | A1* | 1/2011 | Desai | H04W 8/005 |
| | | | | 455/41.2 |
| 2012/0150669 | A1* | 6/2012 | Langley | G06Q 20/102 |
| | | | | 705/16 |
| 2012/0166337 | A1* | 6/2012 | Park | G06Q 20/3278 |
| | | | | 705/44 |
| 2012/0233158 | A1* | 9/2012 | Braginsky | H04L 67/18 |
| | | | | 707/724 |
| 2012/0235812 | A1* | 9/2012 | Maia | G01S 13/08 |
| | | | | 340/539.13 |
| 2012/0252418 | A1* | 10/2012 | Kandekar | H04W 4/21 |
| | | | | 455/414.1 |
| 2012/0258669 | A1* | 10/2012 | Honkanen | G01S 3/46 |
| | | | | 455/67.11 |
| 2013/0065584 | A1* | 3/2013 | Lyon | H04W 28/06 |
| | | | | 455/434 |
| 2013/0099920 | A1* | 4/2013 | Song | G08B 21/0277 |
| | | | | 340/539.13 |
| 2013/0109323 | A1* | 5/2013 | Ruutu | H04W 52/0225 |
| | | | | 455/68 |
| 2013/0124630 | A1* | 5/2013 | Reunamaki | H04L 29/1232 |
| | | | | 709/204 |
| 2013/0173315 | A1* | 7/2013 | Dorsey | H04B 7/26 |
| | | | | 705/5 |
| 2013/0217332 | A1* | 8/2013 | Altman | H04W 4/025 |
| | | | | 455/41.2 |
| 2013/0225197 | A1* | 8/2013 | McGregor | G01S 1/68 |
| | | | | 455/456.1 |
| 2013/0251216 | A1* | 9/2013 | Smowton | G06K 9/6293 |
| | | | | 382/118 |
| 2014/0108241 | A1* | 4/2014 | Tunnell | G06Q 20/363 |
| | | | | 705/41 |
| 2014/0114780 | A1* | 4/2014 | Menefee | G06Q 20/327 |
| | | | | 705/21 |
| 2014/0172700 | A1* | 6/2014 | Teuwen | G06Q 20/3226 |
| | | | | 705/41 |

(56) References Cited

U.S. PATENT DOCUMENTS

| | | | | |
|---|---|---|---|---|
| 2014/0188708 A1* | 7/2014 | Govindarajan | G06Q 20/202 | 705/39 |
| 2014/0188733 A1* | 7/2014 | Granbery | G06Q 20/20 | 705/64 |
| 2014/0254466 A1* | 9/2014 | Wurster | H04L 51/18 | 370/312 |
| 2015/0051977 A1* | 2/2015 | Lyman | G06Q 40/025 | 705/14.58 |
| 2015/0063472 A1* | 3/2015 | Chatterton | H04W 4/80 | 375/256 |
| 2015/0073980 A1* | 3/2015 | Griffin | G06Q 30/00 | 705/39 |
| 2015/0094080 A1* | 4/2015 | Snyder | H04W 4/02 | 455/456.1 |
| 2015/0332258 A1* | 11/2015 | Kurabi | G06Q 20/3278 | 705/71 |
| 2015/0356289 A1* | 12/2015 | Brown | H04L 63/0884 | 726/7 |

FOREIGN PATENT DOCUMENTS

| | | |
|---|---|---|
| CN | 103269326 A | 8/2013 |
| EP | 1986121 A3 | 5/2010 |
| JP | 2005122747 A | 5/2005 |
| JP | 2005523500 A | 8/2005 |
| JP | 5129404 B1 | 1/2013 |
| JP | 2013258487 A | 12/2013 |
| WO | 03088108 A1 | 10/2003 |
| WO | 2013186943 A1 | 12/2013 |

OTHER PUBLICATIONS

International Appl. No. PCT/US2014/053275, PCT International Search Report and the Written Opinion dated Nov. 21, 2014, 9 pages.

International Appl. No. PCT/US2014/053275, Search Report and Written Opinion, Issued by the International Searching Authority dated Nov. 21, 2014, 9 pages.

* cited by examiner

SYSTEMS AND METHODS FOR ENABLING ADDITIONAL DEVICES TO CHECK IN TO BLUETOOTH LOW ENERGY (BLE) BEACONS

CROSS REFERENCE TO RELATED APPLICATIONS

This application is a continuation of U.S. patent application Ser. No. 16/372,729, filed on Apr. 2, 2019 (now issued as U.S. Pat. No. 10,631,154) which is a continuation of U.S. patent application Ser. No. 15/431,639, filed on Feb. 13, 2017 (now issued as U.S. Pat. No. 10,251,041 on Apr. 2, 2019), which is a continuation of U.S. patent application Ser. No. 15/230,239 filed on Aug. 5, 2016, (now issued as U.S. Pat. No. 9,571,957 on Feb. 14, 2017), which is a continuation of U.S. patent application Ser. No. 14/248,263, filed on Apr. 8, 2014, (now issued as U.S. Pat. No. 9,445,220 on Sep. 13, 2016), which claims priority to the filing date of U.S. Provisional Patent Application No. 61/874,587, filed on Sep. 6, 2013, the disclosures of each of which are hereby incorporated by reference in their entirety.

BACKGROUND

Technical Field

Embodiments disclosed herein are related to systems and methods for enabling additional devices to check in using a Bluetooth® low energy (BLE) beacon.

Related Art

Computer systems and networks have facilitated the tasks of buying, selling and transferring goods. For example, global computer networks, such as the Internet, have allowed purchasers to relatively quickly and efficiently seek and purchase goods online. Similarly, global computer networks provide an efficient and cost-effective medium for sellers to advertise, offer, provide, and sell their goods. Electronic commerce companies provide buyers and sellers with online services and the infrastructure to accept orders of goods from remote purchasers, to perform the financial transactions necessary to confirm and complete the sale of goods, to ship or distribute the goods to remote purchasers, and to perform other related logistics. Technology advances have also allowed for a wider variety of devices and transaction types in the retail and other marketplaces.

One example of a relatively new development within the realm of electronic commerce is the ability to allow a consumer to pay for a good or service at a point of sale through the use of his or her smart phone or other personal mobile device. A user merely needs to have an appropriate payment application or "app" on his or her device, whereupon the user can present his or her phone or other similar device at an appropriate time and location at a retail or other establishment. The retailer or other seller or service provider can then "check in" the given user through some process of reading his or her smart phone or other similar device, after which the seller or service provider can accept payment or credit through some form of communication with the checked in or acknowledged device. This "check in" ability to accept payment or credit without the use of cash, checks, credit cards, or other traditional payment means can be particularly helpful in many settings.

Unfortunately, such setups are not without their own drawbacks and inconvenient features. In many instances, the current check in process can be time consuming. For example, current check in procedures often require the customer to take out his or her phone or other device at a point of sale in order to make a payment or provide a credit. This often involves the device searching for the appropriate wireless connection at the store, searching for the store among many possible choices on the device, and/or manual user input or selection on his or her personal mobile device, all of which can take some inconvenient amount of time. In addition, some check ins may fail, even if automated, due to the limits on the number of devices or users that can be checked in at one time. Even small amounts of time that are less than a minute can be frustrating where other consumers are waiting in line behind the user at a register or other point of sale.

Figure 1:
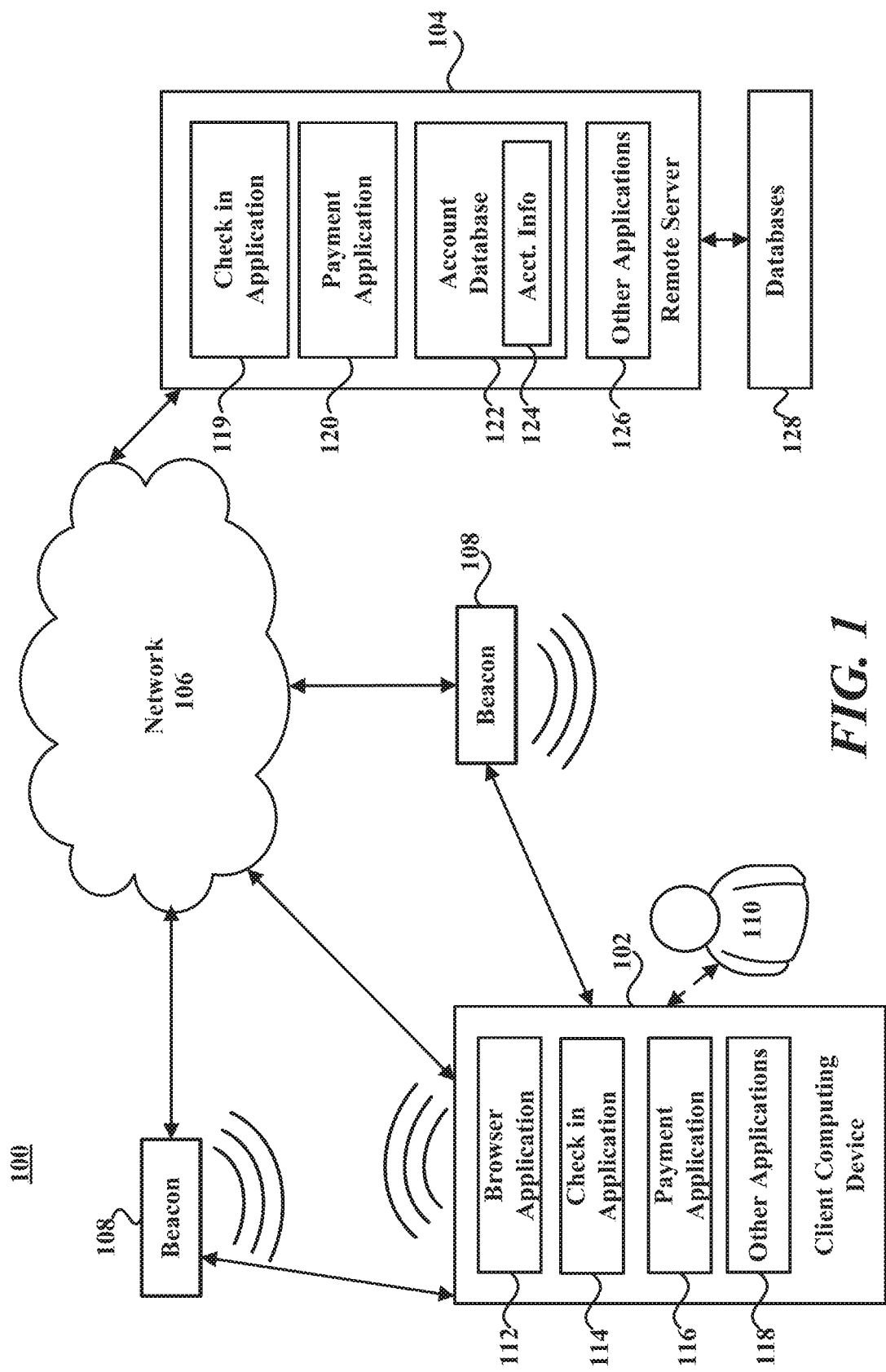
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

What is needed are systems and methods for automatically checking in many users into a location.

Consistent with some embodiments, there is provided a system. The system includes one or more wireless transceivers configured to send a device identifier to a user device in communication with the one or more wireless transceivers when the user device completes a check in, establish communications with the user device based on the device identifier when content for the user device is received from a remote server, and send content to the user device, wherein the one or more wireless transceivers are further configured to communicate with the user device using a Bluetooth® low energy (BLE) communications protocol. The system also includes a network interface component coupled to the one or more wireless transceivers and in communication with the remote server over a network, the network interface component configured to receive the device identifier and the content from the remote server. The system also includes one or more processors configured to determine when the device identifier is present and determine when the content is received from remote server, and a memory.

Consistent with some embodiments, there is also provided a method. The method includes steps of communicating with a beacon using Bluetooth® low energy communications protocol to check in to a location, receiving a device identifier and instructions to broadcast the device identifier from the beacon, broadcasting the device identifier, wherein communicating with the beacon stops after receiving the device identifier, re-establishing communications with the beacon in response to a request from the beacon, and receiving content from the beacon, wherein the re-established communications with the beacon stop after receiving the beacon. The method may be embodied in computer-readable media.

Consistent with some embodiments, there is further provided a method. The method includes steps of checking a user into a location, assigning to the user a device identifier to be broadcast by a device associated with the user for an expiration time using a Bluetooth® low energy (BLE) communications protocol, sending content to the user based on the device identifier, and checking the user out of the location when the device identifier is no longer broadcast at the location or the expiration time associated has passed. The method may be embodied in computer-readable media.

Consequently, embodiments described herein may allow a BLE beacon to facilitate a check in with one user device and disconnect from the user device so that the channels and resources needed to facilitate the check in are freed up for other user devices. The embodiments described herein may then allow the BLE beacon to quickly connect a user device using a unique identifier assigned to the user device to deliver content.

FIG. 1 is a block diagram of a networked system 100, consistent with some embodiments. System 100 includes a client computing device 102 and a remote server 104 in communication over a network 106. Remote server 104 may be a payment service provider server that may be maintained by a payment service provider, such as PayPal, Inc. of San Jose, Calif. Remote server 104 may be maintained by other service providers in different embodiments. Remote server 104 may also be maintained by an entity with which sensitive credentials and information may be exchanged with client computing device 102. Remote server 104 may further be one or more servers that hosts functionality for users to "check in" to a location, event, and the like. Checking in may provide the user that checks in with special offers, deals, and the like, and may let the merchant or other proprietor of the location or event that the user is there. The user may also check in to a location for social purposes to let friends and contacts of the user know that they have checked in. Remote server 104 may be more generally a web site, an online content manager, a service provider, such as a bank, or other entity who provides content to a user requiring user authentication or login.

Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 106. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices.

As shown in FIG. 1, system 100 may include one or more beacons 108. In some embodiments, beacons 108 may be installed at a merchant location, such as a store, restaurant, and the like, and other locations where user 110 may be able to check in and receive additional content, offers, features, or payment options. In some embodiments, beacons 108 may be Bluetooth® Low Energy (BLE) beacons. BLE is a technology that transmits information at a frequency of about 2.4 GHz (about 2042-2480 MHz) over forty (40) 2-MHz wide channels, and has a range of about 50 meter or about 160 feet. Information transmitted according to the BLE protocol may be transmitted at a rate of about 1 Mbit/s with an application throughput of about 0.27 Mbit/s. In some embodiments, BLE communications may be secured using 128-bit Advanced Encryption Standard (AES) encryption with counter mode with a cipher block chaining message authentication code (CBC-MAC) and user defined security. Further, in some embodiments, BLE communications may utilize adaptive frequency hopping, lazy acknowledgement, a 24-bit cyclic redundancy check (CRC) and 32-bit message integrity check for robustness. Moreover, in some embodiments, BLE-capable devices may consume a fraction of the power of standard Bluetooth® devices due to the protocol allowing low duty cycles, and being designed for applications that may not require continuous data transfer. Beacons 108 may transmit one or more sequences of information such that when a device such as client computing device 102 capable of receiving information from beacons 108 comes within the range of a beacon 108, the device may receive a transmission from a beacon 108 that may include information, data, metadata, and the like that may be displayed by client computing device 102 or used by client computing device 102 to initiate communications with beacon 108. In some embodiments, beacon 108 may be in communication with remote server 104 over network 106 through wireless or wired connection. In particular, beacon 108 may be in communication with remote server 104 over network 106. Beacon 108 may also transmit information to client computing device 102 using other wireless communication protocols, such as Bluetooth®, Near Field Communications (NFC), Radio Frequency Identification (RFID), and the like.

Client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. In some embodiments, the instructions may be executed by the one or more processors in response to interaction by user 110. For example, such instructions may include browser application 112 such as a mobile browser application, which may be used to provide a user interface to permit user 110 to browse information available over network 106, including information hosted by remote server 104. For example, browser application 112 may be implemented as a web browser to view information available over network 106. Browser application 112 may include a graphical user interface (GUI) that is configured to allow user 110 to interface and communicate with remote server 104 or other servers managed by content providers or merchants via network 106. For example, user 110 may be able to access websites to find and purchase items, as well as access user account information or web content.

Client computing device 102 may also include a check in application 114 that may allow user 110 to check in to a location using a check in platform or service such as may be provided by PayPal, Inc. of San Jose, Calif., Foursquare of New York, N.Y., Facebook, Inc., of Menlo Park, Calif., or Google+ of Google, Inc. of Mountain View, Calif., Yelp Inc. of San Francisco, Calif., or by a merchant or location, and implemented by remote server 104. In some embodiments, check in application may include multiple application programming interfaces (APIs) for checking in to one or more of the check in platforms or services. In some embodiments, checking in to a location while visiting a location such as a merchant physical storefront may provide user with exclusive deals, offers, or may allow user to purchase and pay for items.

Client computing device 102 may also include a payment application 116 that may be used by user 110 using client computing device 102 to make a payment. In some embodiments, payment application 116 may be configured to make a payment using remote server 104 as a payment processor. In some embodiments, functionalities provided by check in application 114 and payment application 116 may actually be provided by a single application. Client computing device 102 may include other applications 118 as may be desired in one or more embodiments to provide additional features available to user 110, including accessing a user account with remote server 104. For example, applications 118 may include interfaces and communication protocols that allow the user to receive and transmit information through network 106 and to remote server 104 and other online sites. Applications 118 may also include security applications for implementing client-side security features, programmatic client applications for interfacing with appropriate APIs over network 106 or various other types of generally known programs and/or applications. Applications 116 may include mobile applications downloaded and resident on client computing device 102 that enables user 110 to access content through the applications.

Remote server 104, according to some embodiments, may be maintained by an online payment provider, such as PayPal, Inc. of San Jose, Calif., which may provide processing for online financial and information transactions on behalf of user 110. Remote server 104, according to some embodiments, may also be maintained by a service that processes check ins so that a proprietor of a location, such as a merchant, or others know that user 110 is at the location or is able to provide user 110 with the ability to pay for goods using client computing device, receive offers, receive loyalty points, and the like. Remote server 104 may also be capable of providing access to a merchant's goods and services (collectively referred to as "items") that are for purchase and may provide a payment service processing for the purchased items. Remote server 104 may include at least check in application 119, which may be configured to interact with client computing device 102 and beacon 108 to check user 110 in to a location. In some embodiments, checking client computing device 102 in to a location may allow user 110 and client computing device 102, to access features, specials, offers, and the like offered by the location. In some embodiments, these features, specials, offers, and the like may be provided and processed by remote server 104 on behalf of the location. In some embodiments, check ins may be automatic check ins made through the communication of client computing device 102 and beacon 108, such as described in U.S. patent application Ser. No. 13/938,860, filed on Jul. 10, 2013, and U.S. patent application Ser. No. 14/021,045, filed on Sep. 9, 2013, the entire contents of both of these applications which are hereby incorporated by reference in their entirety.

Remote server 104 may also include a payment application 120 that may facilitate processing payments for user 110 to merchants, for example. In some embodiments, payment application 120 may be configured to interface with payment application 116 to receive payment details, user information, merchant information, and additional information for processing a payment on behalf of user 110. Payment application 120 may also be capable of interfacing with check in application 119 such that when a check in is processed a payment may be authorized for the location in which user 110 is checking in to. In some embodiments, functionalities provided by check in application 119 and payment application 120 may actually be provided by a single application. Remote server 104 may also include an account database 122 that includes account information 124 for users having an account on remote server 104, such as user 110. In some embodiments, payment application 120 may process payments based on information in account information 124 of account database 122. Remote server 104 may include other applications 126 and may also be in communication with one or more external databases 128, that may provide additional information that may be used by remote server 104. In some embodiments, databases 128 may be databases maintained by third parties, and may include third party account information of user 110.

As used herein, user 110 may have an account with remote server 104 such that account information 124 includes information about user 110. When user 110 checks in with remote server 104 or performs other authentication with remote server 104, client computing device 102 may be associated with user 110 such that remote server 104 recognizes client computing device 102 as being associated with user 110. In some embodiments, remote server 104 may send a cookie or other object to client computing device 102 that provides an indication of the association between user 110 and client computing device 102.

Although discussion has been made of applications and applications on client computing device 102 and remote server 104, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the applications.

Figure 2:
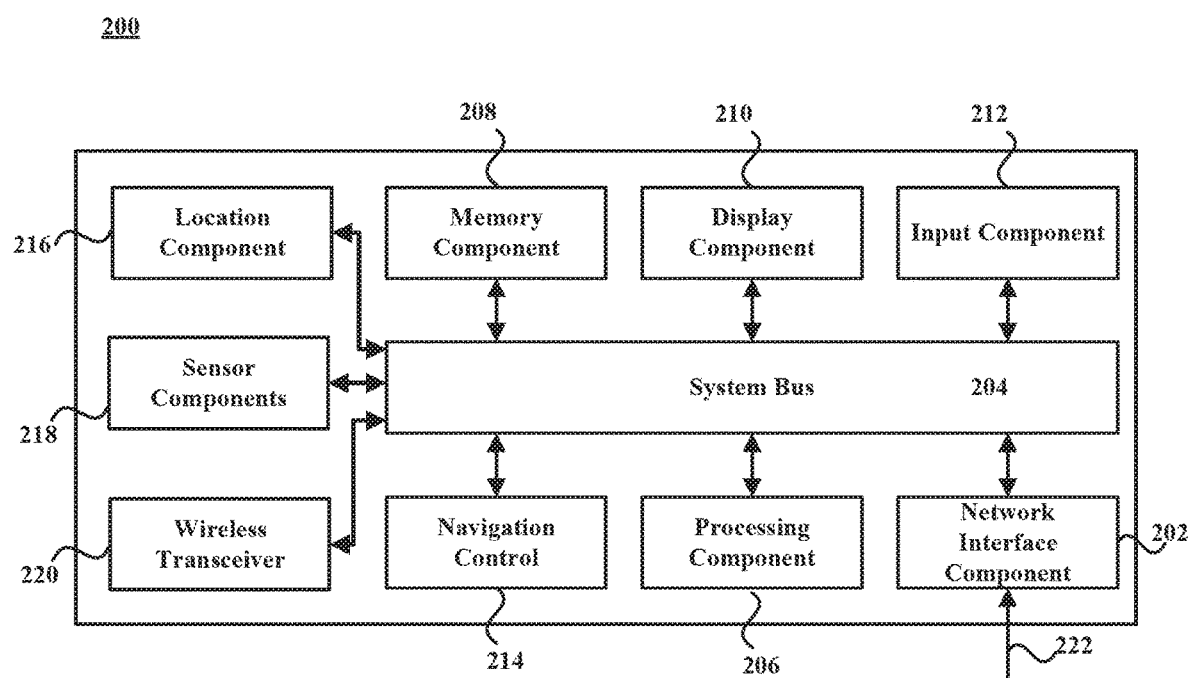
FIG. 2 is a diagram illustrating a computing system, consistent with some embodiments.

FIG. 2 is a diagram illustrating computing system 200, which may correspond to either of client computing device 102 or remote server 104, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 104. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 106. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs) or digital signal processors (DSPs), and a memory component 208, which may correspond to a random access memory (RAM), an internal memory component, a read-only memory (ROM), or an external or static optical, magnetic, or solid-state memory. Consistent with some embodiments, computing system 200 further includes a display component 210 for displaying information to a user of computing system 200. Display component 210 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 212, allowing for a user of computing system 200, such as consumer 120, to input information to computing system 200. Such information could include payment information such as an amount required to complete a transaction, account information, authentication information such as a credential, or identification information. An input component 212 may include, for example, a keyboard or key pad, whether physical or virtual. Computing system 200 may further include a navigation control component 214, configured to allow a user to navigate along display component 210. Consistent with some embodiments, navigation control component 214 may be a mouse, a trackball, or other such device. Moreover, if device 200 includes a touch screen, display component 210, input component 212, and navigation control 214 may be a single integrated component, such as a capacitive sensor-based touch screen.

Computing system 200 may further include a location component 216 for determining a location of computing system 200. In some embodiments, location component 216 may correspond to a GPS transceiver that is in communication with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200. Computing system 200 may also include sensor components 218. Sensor components 218 provide sensor functionality, and may correspond to sensors built into client computing device 102 or sensor peripherals coupled to client computing device 102. Sensor components 218 may include any sensory device that captures information related to user 110 and/or client computing device 102 that may be associated with any actions that user 110 performs using client computing device 102. Sensor components 218 may include camera and imaging components, accelerometers, biometric readers, GPS devices, motion capture devices, and other devices that are capable of providing information about client computing device 102 or user 110, or an environment therearound. Computing system 200 may also include one or more wireless transceivers 220 that may each include an antenna that is separable or integral and is capable of transmitting and receiving information according to one or more wireless network protocols, such as Wi-Fi™, 3G, 4G, HSDPA, LTE, RF, NFC, IEEE 802.11a, b, g, n, ac, or ad, Bluetooth®, BLE, WiMAX, ZigBee®, etc.

Computing system 200 may perform specific operations by processing component 206 executing one or more sequences of instructions contained memory component 208. In other embodiments, hard-wired circuitry may be used in place of or in combination with software instructions to implement the present disclosure. Logic may be encoded in a computer readable medium, which may refer to any medium that participates in providing instructions to processing component 206 for execution, including memory component 208. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 222 and network interface component 202 and wireless transceiver 220. Received program code may be executed by processing component 206 as received and/or stored in memory component 208.

Figure 3:
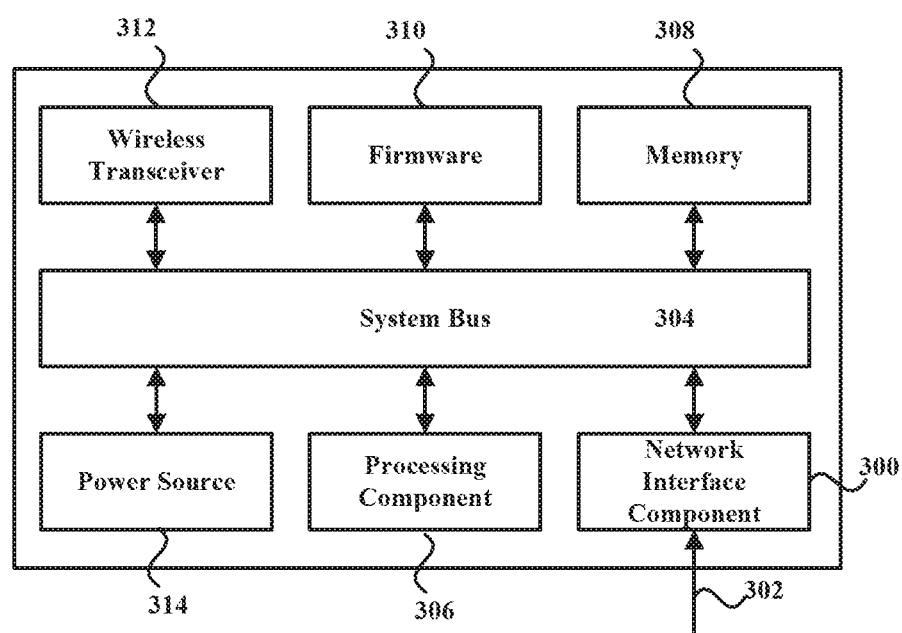
FIG. 3 is a diagram illustrating a beacon, consistent with some embodiments.

FIG. 3 is a diagram illustrating a beacon 108, consistent with some embodiments. As shown in FIG. 3, beacon 108 includes a network interface component (NIC) 300 configured for communication with a network such as network 106 shown in FIG. 1. Consistent with some embodiments, NIC 300 includes a wireless communication component, such as a wireless broadband component, a wireless satellite component, or various other types of wireless communication components including radio frequency (RF), microwave frequency (MWF), and/or infrared (IR) components configured for communication 302 with network 106. Consistent with other embodiments, NIC 300 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Beacon 108 also includes a system bus 304 for interconnecting various components within beacon 108 and communicating information between the various components. Such components include a processing component 306, which may be one or more processors, micro-controllers, graphics processing units (GPUs) or digital signal processors (DSPs), a memory component 308, firmware 310 and one or more wireless transceivers 312 that may each include an antenna that is separable or integral and is capable of transmitting and receiving information according to one or more wireless network protocols, such as Wi-Fi™ 3G, 4G, HSDPA, LTE, RF, NFC, IEEE 802.11a, b, g, n, ac, or ad, Bluetooth®, BLE, WiMAX, ZigBee®, etc. Beacon 108 may also include a power source 314. Power source 314 may be any power source capable of providing sufficient current to power the components of beacon 108. In some embodiments, power source 318 may be a battery, such as a watch battery or button cell.

In some embodiments, beacon 108 may be configured to transmit information using wireless transceivers 312 based on instructions stored in memory 308 and/or firmware 310 executed by processing component 306. The instructions may be stored in memory 308 and/or firmware 310 by directly writing the instructions to memory 308 and/or firmware 310 over communication link 302 to beacon hardware interface 300 or by wirelessly receiving instructions by wireless transceivers 312. In some embodiments, beacon 108 may be configured to transmit information related to checking in to a merchant associated with beacon 108. In some embodiments, beacon 108 may also transmit instructions that when received by client computing device 102 may cause check in application 114 or payment application 116 to be executed by processing component 206 to cause client computing device 102 to perform a check in at the merchant associated with beacon 108. Further, beacon 108 may transfer instructions that, when received by client computing device 102 cause payment application 116 to be executed by processing component to allow user 110 to authorize a payment to be processed by remote server 104. In some embodiments, wireless transceiver 312 may correspond to a BLE transceiver configured to transmit and receive information according to the BLE protocol. In some embodiments, beacon 108 may be a BLE beacon or dongle such as described in U.S. patent application Ser. No. 13/938, 860, filed on Jul. 10, 2013, the entire contents of which are hereby incorporated by reference in their entirety. Further, BLE beacon 108 may have a design such as shown in U.S. Design Application No. 29/455,720, filed May 23, 2013, the entire contents of which are also incorporated herein by reference in their entirety.

As will be readily appreciated, the foregoing networks, systems, devices, methods and variations thereof can be used to implement an automated check in of users at a cooperating or subscribing establishment, such that subsequent purchase transactions and other activities can be more streamlined and convenient.

Figure 4:
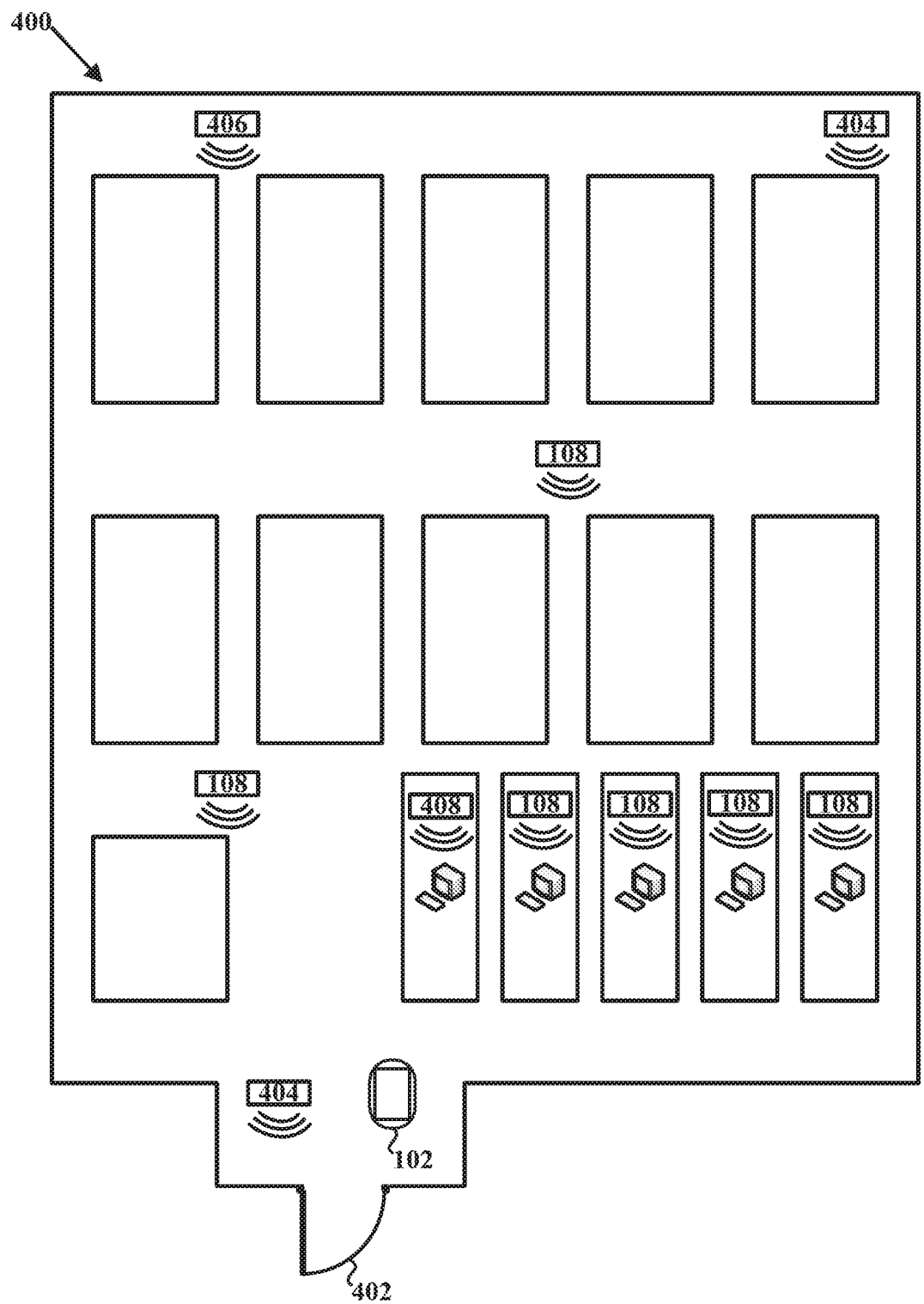
FIG. 4 is a diagram illustrating a location having multiple beacons throughout the location.

FIG. 4 illustrates in block diagram format an exemplary merchant location 400 and associated system components adapted for implementing the purchase of goods or services using automatic wireless consumer check ins according to some embodiments. It will be readily appreciated that this particular layout of merchant location 400 is only provided for purposes of illustration, and that many other types of layouts, devices, procedures and the like could be effectively implemented using the various principles of the present disclosure.

Merchant location 400 includes an indoor store floor having a number of beacons 108. In some embodiments, beacons 108 may be BLE beacons. Beacons 108 may further be in communication with remote server 104 over network 106. These devices can be distributed strategically throughout merchant location, such as near the front door 402, at central locations, and/or at locations of high volume traffic within the establishment. One or more client computing devices 102, such as smartphones, tablets or the like, can interact with one or more of the beacons 108 throughout the store. Preferably, only one interaction with a beacon is needed for a check in, although it may be useful for an establishment to know where user 110 is located and/or user 110 travel and shopping patterns or habits within a store. Such further information can be used to provide further advertising and promotional offers (e.g., related to something at or near where the user is physically located), and/or to authenticate the actual user versus one who may have stolen or is otherwise using the mobile device in an unauthorized fashion. Such further authentication can involve checking known user 110 traffic and shopping patterns against what is currently happening for a given device 102.

An actual automatic check in process can involve a subscribed or affirmatively active user 110 entering a merchant location 400, whereupon client computing device 102 associated with user 110 has a low level background program such as check in application 114 running that detects a low level BLE signal from one or more beacons 108 in the store. Client computing device 102 can then "wake up" and communicate on a more active level with beacon 108. In some embodiments, a unique device identifier and token can be generated and assigned to client computing device 102 for a particular time, location and session, with appropriate expiration and other safeguards in place to protect against fraud or other misuse. For example, a period of one or two hours might suffice for a typical check in session or event. The process of establishing communications between client computing device 102 and beacon 108 and exchanging metadata and a one-time use beacon token to perform a check in is described in U.S. patent application Ser. No. 13/938,860, filed on Jul. 10, 2013, and U.S. patent application Ser. No. 14/021,045, filed on Sep. 9, 2013, the entire contents of both of these applications which are hereby incorporated by reference in their entirety.

However, parts used to produce beacons 108 may have a limited amount of communications channels that allow for simultaneous communications with devices such as client computing device 102. For example, processing component 306 and wireless transceiver 312 may be currently configured to only handle a limited number of simultaneous communications channels such that a beacon 108 may only be able to be in communication with, to check in, provide offers, process payments, and the like, with a limited number of client computing device 102. In particular, current integrated circuits (ICs), and microchips used for current BLE devices may only handle a maximum of 37 concurrent data channels. As a result, if more than 37 different client computing devices 102 enter merchant location 400 through door 402, beacon 108 cannot communicate will all of the client computing devices 102, which means that beacon 108 may not be able to check in all of the client computing devices 102 or process payments for facilitate payment processing for each of the client computing devices 102.

Figure 5:
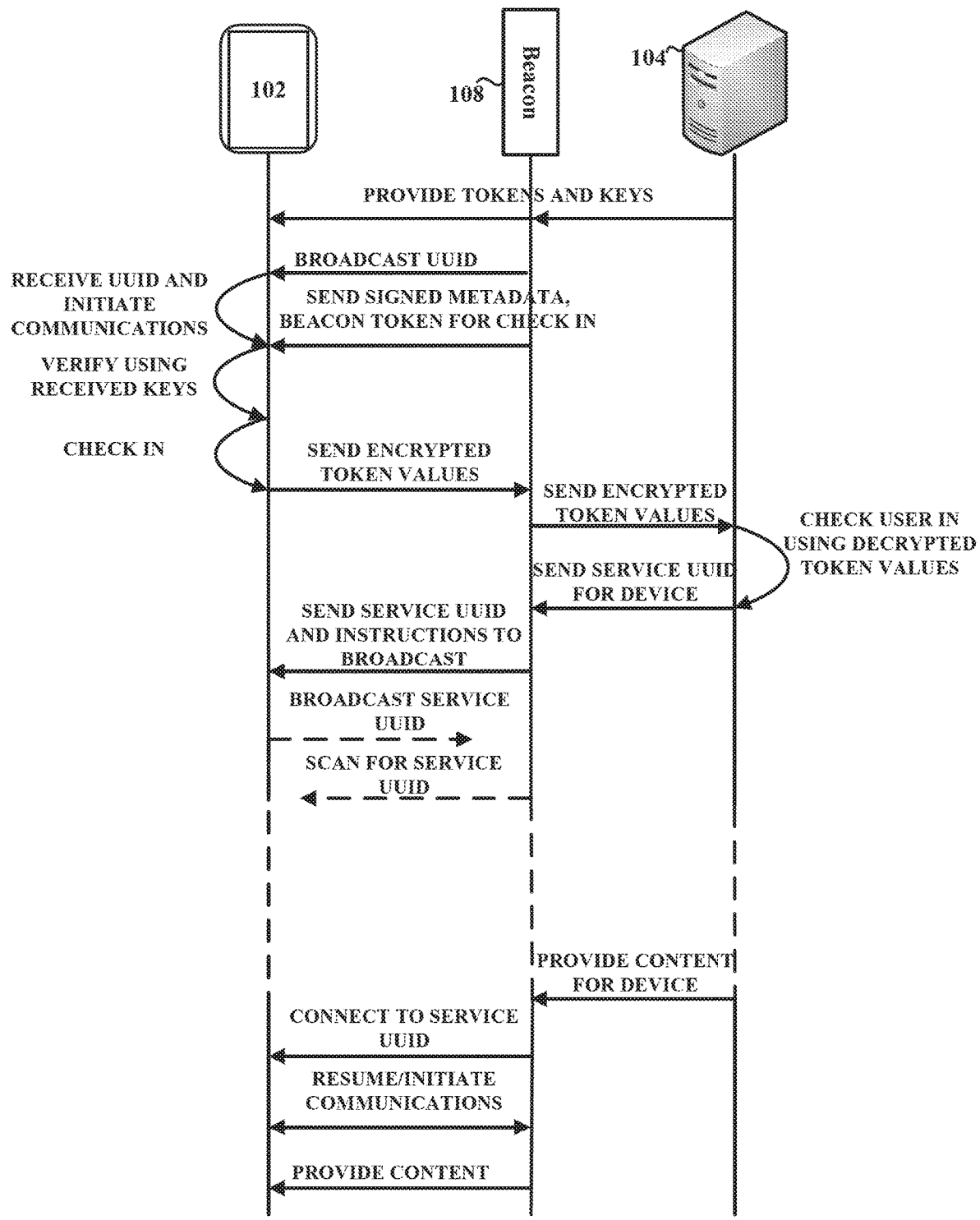
FIG. 5 is a diagram illustrating a flow for enabling additional client computing devices to be in communication with a beacon, consistent with some embodiments.

FIG. 5 is a diagram illustrating a flow for enabling additional client computing devices 102 to be in communication with a beacon 108, consistent with some embodiments. As shown in FIG. 5, remote server 104 may provide beacon 108 and client computing device 102 with tokens and keys. In some embodiments, the tokens and keys may be one-time use payment tokens and associated keys wherein the associated keys may include a pair of symmetric keys and the tokens can each have, for example, a user identifier, a token value, a key serial number and an AES or other crypto key. In some embodiments, remote server 104 may provide beacon with tokens and keys when beacon 108 is set up to work with remote server 104 for checking in users through remote server 104. Remote server 104 may further provide beacon 108 with digital signatures and merchant one-time use tokens that may be used to track check ins and transactions. In some embodiments, tokens and keys may be provided to client computing device 102 when user 110 using client computing device 102 signs up for a check in service provided by remote server 104 and/or when check in application 114 is installed on client computing device 102.

Beacon 108 may then continuously broadcast a generic identifier. In some embodiments, the identifier may be a universally unique identifier (UUID). The broadcast UUID may be received by client computing device 102 to initiate communications with beacon 108. Beacon 108 may then provide signed metadata, a specific one-time use beacon token, and a digital signature associated with the signed metadata to client computing device 102. In some embodiments, client computing device 102 may request the metadata and other information from beacon 108 when communications are initiated with beacon 108. Check in application may be configured to verify the metadata and other information, such as the digital signature as being issued by the service provider, by using a public key received from remote server 104. When the digital signature is verified as authentic, check in application 114 may then provide user 110 with the option to check in. When user 110 checks in, client computing device 102 may select a token received from remote server 104, encrypt the selected token value and the received beacon token value using a key associated with the selected token, and send these encrypted token values to beacon 108. Beacon 108 then sends the encrypted token values to remote server which decrypts the values and checks in user 110 and user device 102 using the decrypted values. The process of checking in by communicating with a BLE beacon, such as beacon 108, is further described in in U.S. patent application Ser. No. 13/938,860, filed on Jul. 10, 2013, and U.S. patent application Ser. No. 14/021,045, filed on Sep. 9, 2013, the entire contents of both of these applications which are hereby incorporated by reference in their entirety.

Remote server 104 may then assign a device identifier the client computing device 102 and associated user 110, and send the assigned device identifier to beacon 108. In some embodiments, the device identifier may be a service UUID that is randomly generated by processing component 206 of remote server 104 at the time that user 110 and user device 102 is checked in, and stored in account information 124 of account database 122, for example in a table, associated with user 110 and the associated client computing device 102. The generated UUID may be 32-bits or 128-bits, in some embodiments. Moreover, in some embodiments, the UUID may be randomly generated by processing component 306 of beacon 108. In some embodiments, the service UUID may be provided to other beacons 108 at the same location as the beacon 108 that was in communication with client computing device 102 and provided the encrypted token values to remote server 104. For example, as shown in FIG. 4, client computing device 102 may initially be in communication with beacon 108 near door 402, such that beacon 108 may be provided with a service UUID for client computing device 102 when remote server 104 checks in client computing device 102 and user 110. Then, other beacons 108 in location 400 may also be provided with the service UUID. In some embodiments, memory 308 may include one or more tables or other data structures capable of storing client computing devices 102 and their associated assigned service UUIDs.

When beacon 108 receives a service UUID for client computing device 102, beacon 108 may then send the assigned service UUID to client computing device 102 along with instructions to broadcast the service UUID. Once the service UUID and the instructions to broadcast the service UUID are delivered to client computing device 102, beacon 108 stops active communications with client computing device 102 freeing up the channel and resources that were being used to communicate with client computing device 102.

Client computing device 102 may then begin to advertise the service UUID while beacon 108, and other beacons 108, passively scan for the service UUID to be broadcasted. In some embodiments, a check in processed by remote server 104 may have an expiration time such that the instructions to broadcast the service UUID provided to client computing device 102 by beacon 108 may include an instruction to only broadcast the service UUID for a time equal to the expiration time. In some embodiments, the expiration time may be between about 1 hour and about 3 hours. In particular, the expiration time may be about 2 hours.

When processing component 206 of remote server 104 determines that content should be provided to client computing device 102, the content may be sent to beacon 108 along with the specific service UUID to which the content should be provided. Beacon 108 may then look for the specific service UUID and connect to client computing device 102 broadcasting the specific service UUID, resume (or initiate if a different beacon 108 than used to facilitate the check in) communications, and provide the content to client computing device 102. Once the content has been provided, beacon 108 may then cease active communications with client computing device 102, freeing up the channel and resources that were being used such that they may be used for communicating with other devices.

In some embodiments, the content that may be provided to device may be offers, deals, specials, information about location 400, and other such content. As noted above, beacons 108 in location 400 may each scan for a UUID assigned to client computing device 102 and broadcast client computing device 102. Consequently, in some embodiments, if beacon 404 scans for the service UUID associated with client computing device 102 and finds client computing device 102, beacon 404 can provide this information to remote server 104. Remote server 104 may then know that client computing device 102 and user 110 are located in the proximity of beacon 404. As a result, remote server 104 may be able to provide content related to the area of location 400 in which client computing device 102 is found. For example, remote server 104 may provide offers or advertisements for products located near beacon 404 when beacon 404 notices client computing device 102 broadcasting its assigned service UUID. Then, when beacon 406 notices the service UUID associated with client computing device 102, remote server 104 may provide offers or advertisements related to products near beacon 406. As another example, location may be a museum or landmark, and the like, and remote server 104 may provide information related to an exhibit or work at the location of beacon 404 when beacon 404 notices the service UUID associated with client computing device 102 and the provide information related to a different exhibit or work located near beacon 406 when beacon 406 notices the service UUID associated with client computing device 102.

In some embodiments, that content that may be provided to client computing device 102 may be transaction-related content, including content related to paying for items user 110 is purchasing from location 400. For example, if beacon 408 notices the service UUID associated with client computing device 102, remote server 104 may provide content related to a purchase or transaction. In some embodiments, if no beacon 108 in location 400 notices the service UUID associated with client computing device 102 while scanning, this information can be provided to remote server 104 such that remote server 104 can assume that user 110 and client computing device 102 are no longer in location 400 and can check user 110 and client computing device 102 out of location 400.

Figure 6:
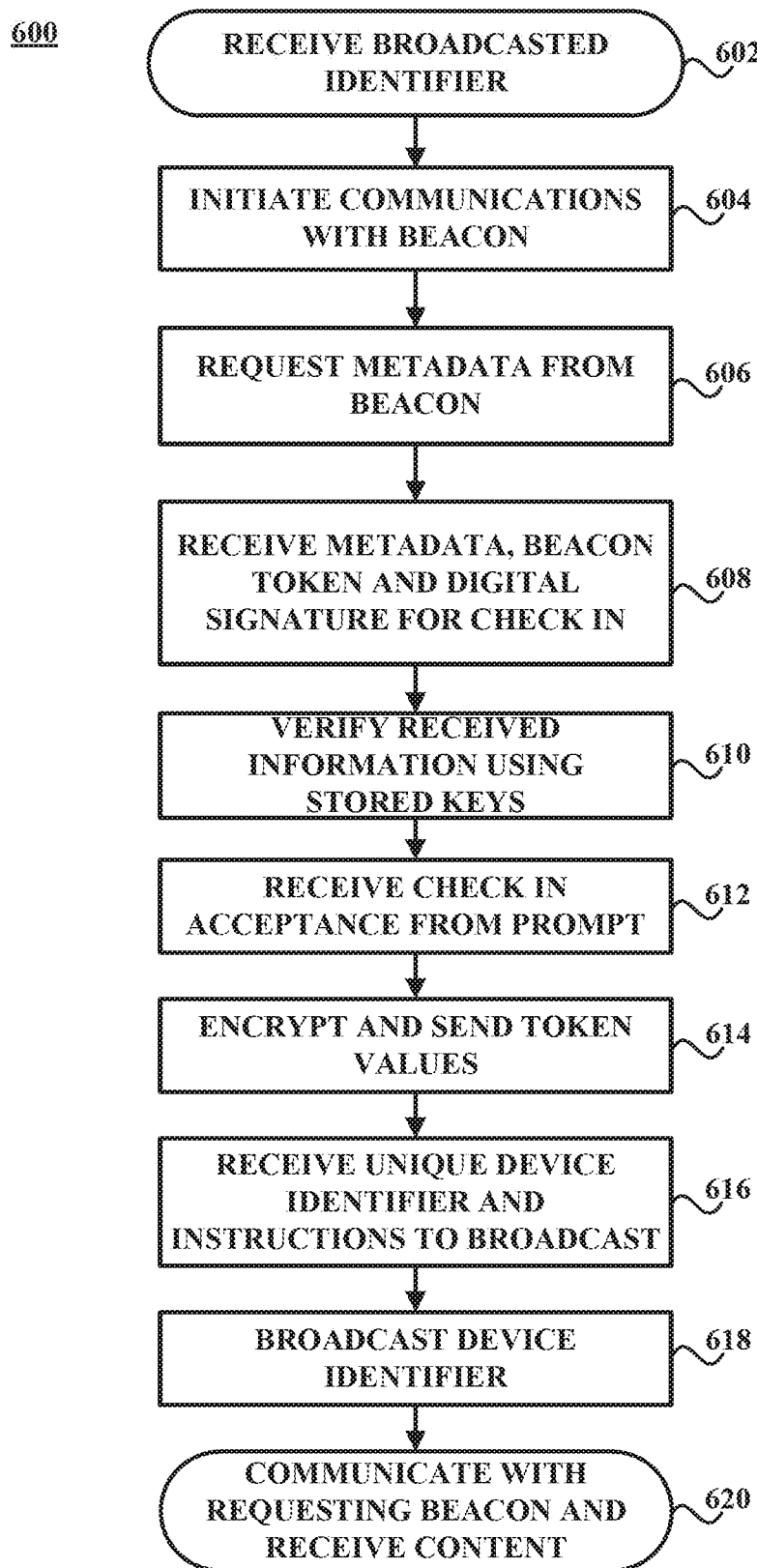
FIG. 6 is a flowchart illustrating a process for checking in to a location using a beacon, consistent with some embodiments.

FIG. 6 is a flowchart illustrating a process 600 for checking in to a location using a beacon, consistent with some embodiments. For the purpose of illustration, FIG. 6 may be described with reference to any of FIGS. 1-5. Process 600 shown in FIG. 6 may be embodied in computer-readable instructions for execution by one or more processors such that one or more of the steps of the method may be performed by processing component 206 of client computing device 102. As shown in FIG. 6, process 600 may begin when client computing device 102 receives a broadcasted identifier (602). The broadcasted identifier may be a UUID received from one or more beacons 108 in a location 400, including beacon 404, 406, or 408. In some embodiments, beacons 108, 404, 406, and 408 may be BLE beacons such that the identifier may be broadcast according to BLE communications protocols. Client computing device 102 may include wireless transceiver 220 that may be capable of communicating with a beacon 108 using BLE communication protocols and receiving the broadcasted identifier.

Client computing device 102 may then initiate communications with beacon 108 (604). In some embodiments, client computing device 102 may receive one or more tokens and a set of keys from remote server 104 for use in checking in when client computing device 102 signs up for an account with remote server 104, registers for checking in with remote server 104, or installs check in application 114. The received tokens and keys may be stored in memory component 208 of client computing device 102 and processing component 206 of client computing device may verify the received identifier using the stored token.

Client computing device 102 may then request metadata and other information from beacon 108 (606). In response, client computing device 102 may receive metadata, a beacon token and a digital signature from beacon 108 for checking in to location 400 (608). Processing component 206 of client computing device 102 may then verify the received information, including the digital signature, using keys stored in memory component 208 of client computing device 102 and received from remote server (610). Client computing device 102 may then receive a check in acceptance in response to a check in prompt (612). In some embodiments, upon verifying the metadata, beacon token, and digital signature, check in application 114 may prompt user 110 to accept the check in to location 400 by, for example, displaying an interactive prompt on display component 210. User 110 may be able to accept the check in by interacting with the prompt using input component 212, navigation control, and display component 210, or a combination thereof. When the received digital signature is verified, processing component 206 of client computing device 102 may then encrypt token values and send these encrypted values to beacon 108 (614). In some embodiments, the encrypted values may be sent to beacon 108 by wireless transceiver 220 of client computing device 102 using a BLE communication protocol.

Client computing device 102 may then receive a device identifier. and instructions to broadcast the identifier (616). In some embodiments, the received identifier may be a unique service QUID received from beacon 108. The received device identifier may then be stored in memory component 208 and processing component 206 may be configured to execute the instructions such that wireless transceiver 220 broadcasts the device identifier (618). In some embodiments, the instructions may specify that the device identifier is to be broadcasted for as long as an expiration time associated with the check in. Client computing device 102, while broadcasting the device identifier, may receive a request to communicate with beacon 108. When client computing device 102 receives the request, client computing device 102 may then re-establish or initiate communications with the requesting beacon 108 and receive content from the beacon 108 (620). In some embodiments, the content may then be displayed by display component 210 of client computing device 102 for viewing by or taking action by user 110. In some embodiments, the requesting beacon 108 may be the same beacon 108 that client computing device 102 was previously in communication with. In other embodiments, the requesting beacon 108 may be a different beacon 108, wherein the different beacon 108 will be able to initiate communications with client computing device 102 without having to go through steps 602-614 since the beacon token will be the same. Consequently, user 110 having client computing device 102 may enter location 400 and perform steps 602-616 with beacon 404, and then receive a request from beacon 406 while broadcasting the device identifier.

Figure 7:
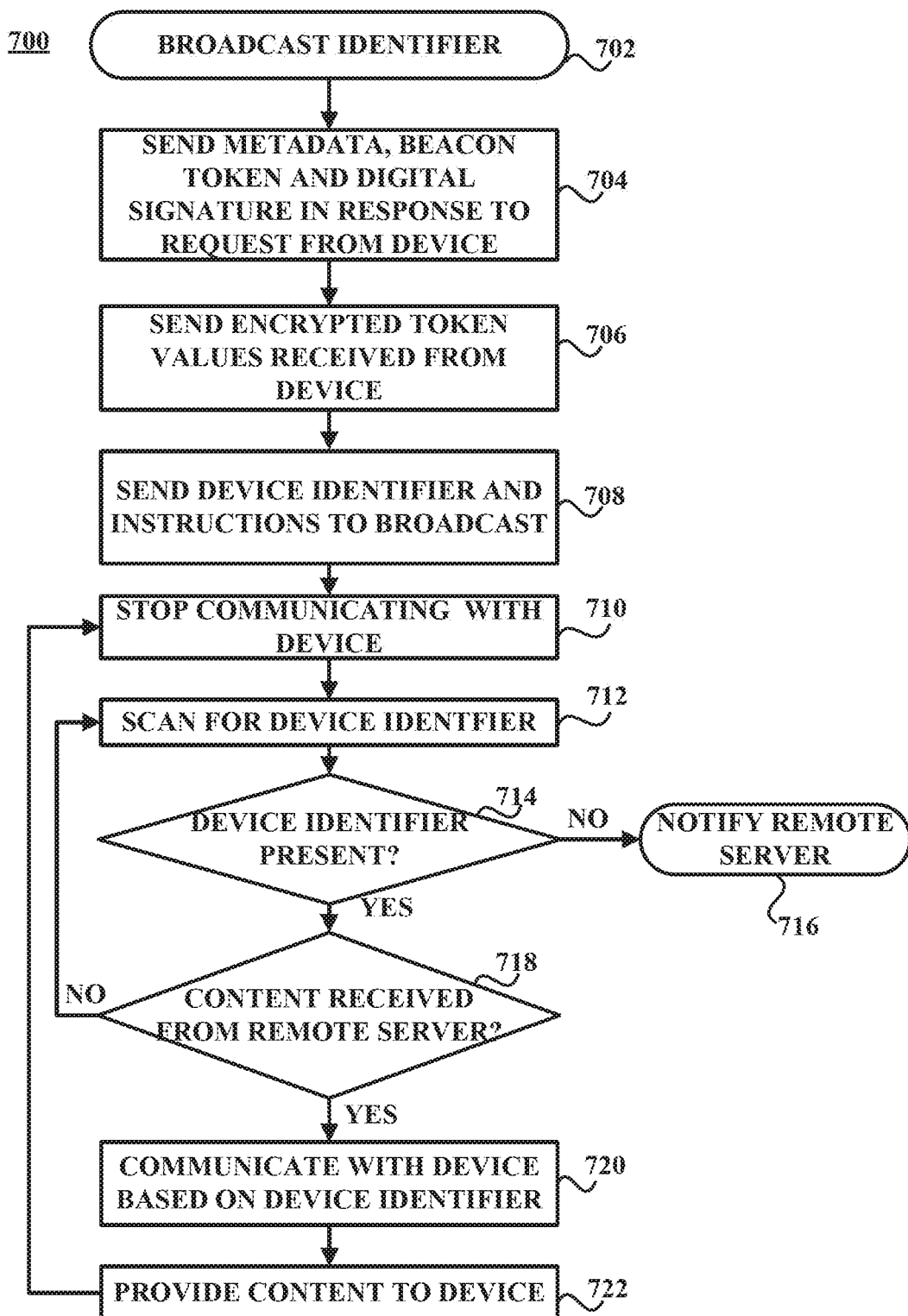
FIG. 7 is a flowchart illustrating a process for checking in to a location using a beacon, consistent with some embodiments.

FIG. 7 is a flowchart illustrating a process 700 for checking in to a location using a beacon, consistent with some embodiments. For the purpose of illustration, FIG. 7 may be described with reference to any of FIGS. 1-5. Process 700 shown in FIG. 7 may be embodied in computer-readable instructions for execution by one or more processors such that one or more of the steps of the method may be performed by processing component 306 of beacon 108, which may generally refer to any beacon 108 shown in FIG. 4, including beacons 404, 406, and 408. As shown in FIG. 7, process 700 may begin when beacon 108 broadcasts an identifier (702). In some embodiments, beacon 108 may be a BLE beacon such that the identifier may be broadcast according to BLE communications protocols. The broadcast identifier may have been received from remote server 104 as part of a setup of beacon 108 in location 400 and may be a UUID.

Beacon 108 may then send metadata, a beacon token, and a digital signature in response to a request received from a device that received the broadcast identifier (704). In some embodiments, the beacon token, digital signature, and metadata may be received from remote server 104 and stored in memory component 308 and/or firmware 310. To complete the check in, beacon 108 may then receive encrypted token values from client computing device 102, which are sent to remote server 104 (706). Beacon 108 may send a device identifier and instructions to broadcast the device identifier to client computing device 102 (708). In some embodiments, the device identifier may be a UUID and the instructions may specify that client computing device 102 is to broadcast the device identifier for as long as an expiration time associated with the check in. Moreover, the device identifier may be randomly generated by remote server 104 and sent to beacon 108 for sending to client computing device 102 or the device identifier may be randomly generated by beacon 108. IN embodiments when beacon 108 randomly generates the device identifier, the generated device identifier may be sent to remote server 104 and other beacons 108 at a locations associated with beacon 108. Beacon 108 may then stop communicating with client computing device 102 (710) to free up the communications channels and resources for use in communicating with other devices.

Although beacon 108 has stopped communicating with client computing device 102, beacon 108 may continue to scan for the device identifier associated with client computing device 102 (712). Beacon 108 may periodically make a determination as to whether the device identifier is present by noting whether the device identifier is found during a scan (714). When the device identifier is determined to not be present, beacon 108 may notify remote server 104 that the device identifier was not present (716). Remote server 104 may then be able to make a determination as to whether another beacon 108 in location noticed the device identifier associated with client computing device 102, or whether, if no beacons 108 in location 400 have noticed the device identifier, that client computing device 102 and user 110 are no longer in location 400.

Beacon 108 may continue to scan for the device identifier associated with client computing device 102 until content is received from remote server 104 (718). When content is received from remote server 104, beacon 108 may communicate with client computing device 102 using the device identifier (720) and provide the received content to client computing device 102 (722). Beacon 108 may then stop communicating with client computing device 102 (710) to free up the communications channels and resources for use in communicating with other devices, and continue to scan for the device identifier associated with client computing device 102 (712). In some embodiments, when a check out expires, or remote server 104 determines that client computing device 102 and user 110 are no longer in location 400, beacon 108 may receive a notification to stop scanning for the device identifier.

Figure 8:
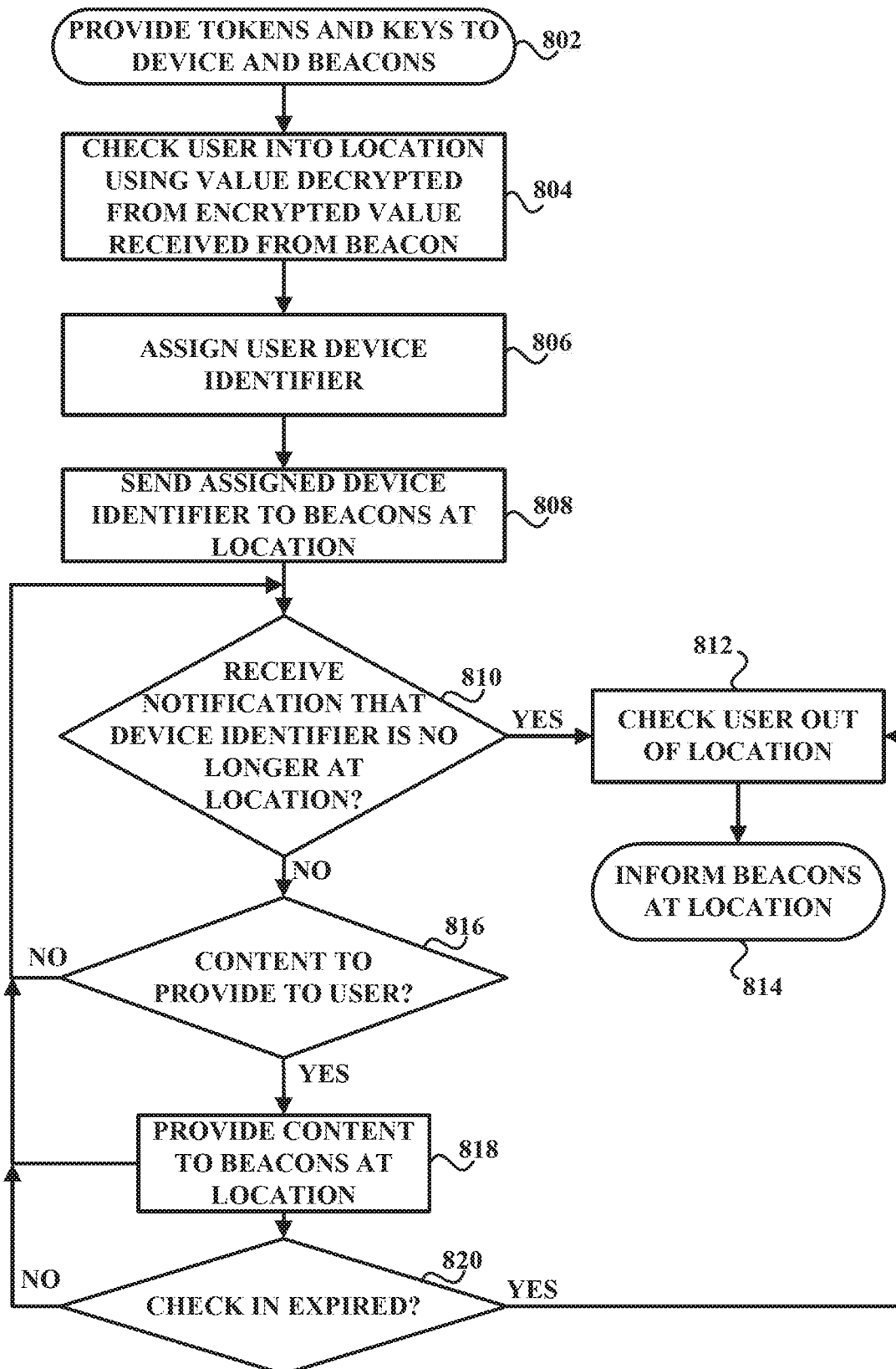
FIG. 8 is a flowchart illustrating a process for checking in to a location using a beacon, consistent with some embodiments.

FIG. 8 is a flowchart illustrating a process 800 for checking in to a location using a beacon, consistent with some embodiments. For the purpose of illustration, FIG. 8 may be described with reference to any of FIGS. 1-5. Process 800 shown in FIG. 8 may be embodied in computer-readable instructions for execution by one or more processors such that one or more of the steps of the method may be performed by processing component 206 of remote server 104. As shown in FIG. 8, process 800 may begin by providing client computing device 102 and beacon 108 tokens and keys (802). In some embodiments, the tokens and keys may be one-time use payment tokens and associated keys wherein the associated keys may include a pair of symmetric keys and the tokens can each have, for example, a user identifier, a token value, a key serial number and an AES or other crypto key. In some embodiments, remote server 104 may provide beacon 108 with tokens and keys when beacon 108 is set up to work with remote server 104 for checking in users through remote server 104. Remote server 104 may further provide beacon 108 with digital signatures and merchant one-time use tokens that may be used to track check ins and transactions. In some embodiments, tokens and keys may be provided to client computing device 102 when user 110 using client computing device 102 signs up for a check in service provided by remote server 104 and/or when check in application 114 is installed on client computing device 102.

Remote server 104 may then check user 110 and client computing device 102 into location 400 using one or more values decrypted from encrypted values received from beacon 108 (804). As discussed above with respect to FIGS. 5-7, when user 110 of client computing device 102 accepts a check in, client computing device 102 may verify a beacon token provided by beacon 108 and may then encrypt token values and send these encrypted values to beacon 108 which may then send the encrypted values to remote server 104 which processing component 206 of remote server 104 may decrypt and use to check in user and client computing device 102 to location 400. Remote server 104 may then assign user 110 and client computing device 102 a device identifier (806) and send the device identifier to beacons 108 at location 400 (808). In some embodiments, the device identifier may be a service UUID that may be generated by processing component 206 of remote server 104, and stored in account information 124 of account database 122, for example in a table, associated with user 110 and the associated client computing device 102.

Remote server 104 in communication with beacons 108 over network 106 may receive a notification that the device identifier is no longer observed at location 400 (810). When this happens, remote server 104 may check user 110 and the associated client computing device 102 out of location 400 (812) and inform beacons 108 at location 400 that user 110 and associated client computing device 102 is no longer at location 400. As described above with respect to FIGS. 5 and 7, a beacon 108 at location 400 may continue to scan for the device identifier assigned to client computing device 102 and may do so until an expiration time has passed or until remote server 104 provides information to the beacon 108 that to no longer scan for the assigned device identifier.

Periodically, processing component 206 of remote server 104 may determine that there is content to provide to user 110 and client computing device 102 (816), and will provide the content to one or more beacons 108 at location 400 (818). In some embodiments, remote server 104 may store and tabulate the beacon 108 that most recently noticed the device identifier when scanning, and send content to only that beacon 108. In some embodiments, the content may be provided to all beacons 108 at location 400 such that each beacon 108 may try to find the device identifier to connect to client computing device 102 and provide the content. Remote server 104 may continue to perform steps 810-818 until a notification that the device identifier is no longer received at location (810) or the expiration time associated with the check in has passed (820).

Software, in accordance with the present disclosure, such as program code and/or data, may be stored on one or more machine-readable mediums, including non-transitory machine-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments described herein may allow a BLE beacon to facilitate a check in with one user device and disconnect from the user device so that the channels and resources needed to facilitate the check in are freed up for other user devices. The embodiments described herein may then allow the BLE beacon to quickly connect a user device using a unique identifier assigned to the user device to deliver content. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system, comprising:
    a non-transitory memory; and
    one or more hardware processors coupled to the non-transitory memory and configured to read instructions from the non-transitory memory to cause the system to perform operations comprising:
    receiving, by a first beacon device of one or more beacon devices, a check-in request from a user device via an electronic communication established between the first beacon device and the user device;
    in response to receiving the check-in request from the user device, transmitting, by the first beacon device, the check-in request to a server device;
    receiving, by the first beacon device from the server device, a device identifier corresponding to the user device;
    transmitting, by the first beacon device to the user device, the device identifier;
    altering, by the first beacon device after the device identifier has been transmitted to the user device, the electronic communication with the user device;
    detecting, by a second beacon device, of the one or more beacon devices after the electronic communication between the first beacon device and the user device has been at altered, a first signal from the user device, wherein the first signal includes the device identifier; and
    in response to detecting the first signal, transmitting, by the second beacon device, a content to the user device, wherein the content is received by the one or more beacon devices from the server device.

2. The system of claim 1, wherein the first beacon device is different from the second beacon device, and wherein the altering comprises dropping off the electronic communication with the user device.

3. The system of claim 2, wherein the second beacon device is in a first location within a merchant location, and wherein the content is an offer corresponding to a product associated with the first location.

4. The system of claim 1, wherein the first beacon device is associated with a first location of a merchant location and wherein the second beacon device is associated with a second location of the merchant location, and wherein the content corresponds to a shopping pattern determined based on the user device connecting to the first beacon device and the second beacon device.

5. The system of claim 1, the operations further comprising broadcasting, by the one or more beacon devices, a generic identifier, wherein a reception of the generic identifier by the user device initiates communications between the one or more beacon devices and the user device.

6. The system of claim 1, the operations further comprising:
    in response to receiving a request for metadata associated with the check-in request from the user device, transmitting, by the one or more beacon devices to the user device the metadata, wherein the metadata is signed using a private key.

7. The system of claim 6, the operations further comprising:
    causing, by the one or more beacon devices, the user device to utilize a public key received from the server device to verify the metadata, wherein an option to check-in is provided on the user device based on a verifying of the metadata.

8. A non-transitory machine-readable medium having stored thereon machine-readable instructions executable to cause a machine to perform operations comprising:
    receiving, by a first wireless communication device of one or more wireless communication devices, a check-in request from a user device via an electronic communication session between the first wireless communication device and the user device;
    in response to receiving the check-in request from the user device, transmitting, by the first wireless communication device, the check-in request to a server device;
    receiving, by the first wireless communication device from the server device, a device identifier corresponding to the user device;
    transmitting, by the first wireless communication device to the user device, the device identifier;
    ending, by the first wireless communication device after the device identifier has been transmitted to the user device, the electronic communication session with the user device for at least a predetermined period of time;
    detecting, by a second wireless communication device of the one or more wireless communication devices after the electronic communication session between the first wireless communication device and the user device has ended for at least a predetermined period of time, a first signal from the user device, wherein the first signal includes the device identifier; and
    in response to detecting the first signal, transmitting, by the second wireless communication device, a content to the user device, wherein the content is received by the one or more wireless communication devices from the server device.

9. The non-transitory machine-readable medium of claim 8, wherein the first wireless communication device and the second wireless communication device are different from one another.

10. The non-transitory machine-readable medium of claim 9, wherein the second wireless communication device is in a first location within a merchant location, and wherein the content is an offer corresponding to a product associated with the first location.

11. The non-transitory machine-readable medium of claim 8, wherein the first wireless communication device is associated with a first location of a merchant location and wherein a second wireless communication device is associated with a second location of the merchant location, and wherein the content corresponds to a shopping pattern determined based on the user device connecting to the first wireless communication device and the second wireless communication device.

12. The non-transitory machine-readable medium of claim 8, the operations further comprising broadcasting, by the one or more wireless communication devices, a generic identifier, wherein a reception of the generic identifier by the user device initiates communications between the one or more wireless communication devices and the user device.

13. The non-transitory machine-readable medium of claim 8, the operations further comprising:
  in response to receiving a request for metadata associated with the check-in request from the user device, transmitting, by the one or more wireless communication devices to the user device the metadata, wherein the metadata is signed using a private key.

14. The non-transitory machine-readable medium of claim 13, the operations further comprising:
  causing, by the one or more wireless communication devices, the user device to utilize a public key received from the server device to verify the metadata, wherein an option to check-in is provided on the user device based on a verifying of the metadata.

15. A method, comprising:
  receiving, by one or more wireless communication devices, a check-in request from a user device via a bilateral wireless channel between the user device and the one or more wireless communication devices;
  in response to receiving the check-in request from the user device, transmitting, by the one or more wireless communication devices, the check-in request to a server device;
  receiving, by the one or more wireless communication devices from the server device, a device identifier corresponding to the user device;
  transmitting, by the one or more wireless communication devices to the user device, the device identifier;
  at least temporarily disconnecting the bilateral wireless channel between the user device and the one or more wireless communication devices;
  detecting, by the one or more wireless communication devices after the bilateral wireless channel has been at least temporarily disconnected, a first signal from the user device, wherein the first signal includes the device identifier;
  in response to detecting the first signal, re-establishing the bilateral wireless channel between the user device and the one or more wireless communication devices; and
  transmitting, by the one or more wireless communication devices via the re-established bilateral wireless channel, a content to the user device, wherein the content is received by the one or more wireless communication devices from the server device.

16. The method of claim 15, wherein a first wireless communication device of the one or more wireless communication devices receives the check-in request, and a second wireless communication device of the one or more wireless communication devices detects the first signal from the user device.

17. The method of claim 16, wherein the second wireless communication device is in a first location within a merchant location, and wherein the content is an offer corresponding to a product associated with the first location.

18. The method of claim 15, wherein the one or more wireless communication devices include a first wireless communication device associated with a first location of a merchant location and a second wireless communication device associated with a second location of the merchant location, and wherein the content corresponds to a shopping pattern determined based on the user device connecting to the first wireless communication device and the second wireless communication device.

19. The method of claim 15, further comprising broadcasting, by the one or more wireless communication devices, a generic identifier, wherein a reception of the generic identifier by the user device initiates communications between the one or more wireless communication devices and the user device.

20. The method of claim 15, further comprising:
  in response to receiving a request for metadata associated with the check-in request from the user device, transmitting, by the one or more wireless communication devices to the user device the metadata, wherein the metadata is signed using a private key.

21. The method of claim 20, further comprising:
  causing, by the one or more wireless communication devices, the user device to utilize a public key received from the server device to verify the metadata, wherein an option to check-in is provided on the user device based on a verifying of the metadata.

* * * * *